United States Patent [19]
Warden et al.

[11] Patent Number: 5,402,908
[45] Date of Patent: Apr. 4, 1995

[54] DIVIDED CONTAINER

[75] Inventors: Jeffrey A. Warden, Southfield; Michael D. Dunham, Sr., Rochester Hills, both of Mich.

[73] Assignee: Letica Corporation, Rochester, Mich.

[21] Appl. No.: 169,041

[22] Filed: Dec. 20, 1993

[51] Int. Cl.$^6$ ............................................. B65D 39/00
[52] U.S. Cl. ........................................ 220/554; 220/529; 220/578
[58] Field of Search .................. 220/529, 554, 578

[56] References Cited

U.S. PATENT DOCUMENTS

| | | |
|---|---|---|
| D. 320,942 | 10/1991 | Lillelund et al. . |
| D. 321,458 | 11/1991 | Lillelund et al. . |
| 446,254 | 2/1891 | Forrester . |
| 593,333 | 11/1897 | Park . |
| 890,196 | 6/1908 | Surbrug . |
| 1,092,902 | 4/1914 | Doggett . |
| 1,145,915 | 7/1915 | Marcuse . |
| 1,818,924 | 8/1931 | Basmadjian . |
| 2,167,619 | 8/1939 | Bainton . |
| 2,227,172 | 12/1940 | Bainton . |
| 2,712,668 | 7/1955 | Thiele .................. 220/529 X |
| 2,761,423 | 9/1956 | Heidler .................. 220/554 X |
| 3,037,653 | 6/1962 | Morisette . |
| 3,040,897 | 6/1962 | Holman . |
| 3,104,010 | 9/1963 | Pence .................. 220/529 X |
| 3,164,289 | 1/1965 | Cocchiarella . |
| 3,719,306 | 3/1973 | Holtzman . |
| 3,987,941 | 10/1976 | Blessing . |
| 4,397,874 | 8/1983 | Piotrowski .................. 220/578 X |
| 4,482,047 | 11/1984 | Ackerman et al. . |
| 4,625,883 | 12/1986 | Burke et al. .................. 220/578 |
| 4,764,391 | 8/1988 | Wasserman et al. . |
| 4,773,556 | 9/1988 | Smith .................. 220/578 |
| 4,874,108 | 10/1989 | Valasek . |
| 5,117,998 | 6/1992 | Handzel .................. 220/578 |
| 5,133,474 | 7/1992 | Smith et al. .................. 220/529 |
| 5,213,230 | 5/1993 | Kral . |
| 5,252,302 | 10/1993 | Schmidt et al. .................. 220/529 X |
| 5,271,520 | 12/1993 | McAfee .................. 220/529 |

*Primary Examiner*—Steven M. Pollard
*Attorney, Agent, or Firm*—Young, MacFarlane & Wood

[57] ABSTRACT

A divisible container apparatus comprising a molded plastic tapered cylindrical open head container, a divider having a centrally located upstanding hollow handle and a tapered peripheral skirt, the divider being locatable within the container in parallel, spaced relationship to the bottom and supported by a plurality of interior support ledges with the peripheral skirt in sealing engagement with the interior wall of the container. A snap-on lid is provided for the container along with a bail for carrying the container apparatus and its contents.

9 Claims, 3 Drawing Sheets

DIVIDED CONTAINER

FIELD OF THE INVENTION

This invention relates to open head containers and more particularly to an open head container having a removable internal divider.

BACKGROUND OF THE INVENTION

It is to known to employ a removable divider to divide the interior volume of an open head container or bucket into several essentially isolated parts. By way of example, the U.S. design patent to Lillelund Des. 320,942 illustrates a divider insert for a tapered, open head container. The divider insert has three vertical walls which appear to meet at the longitudinal center line of an open head container to divide the interior of the container into three parts, each of which is accessible through the open top of a container.

Other devices have been conceived for controlling the interior volume of a straight sided or cylindrical open head container so as to reduce the dead air space within the container and preserve the freshness and usability of food products or paint. In these cases the divider is circular in plan and is oriented within the container at right angles to the longitudinal axis of symmetry.

An example is Blessing U.S. Pat. No. 3,987,941 which illustrates a vertically movable follower 18 having a flexible, wiper-like seal 24 about the periphery so as to be engagable with the interior wall of a cylindrical container 12. A generally similar arrangement is illustrated in Kral U.S. Pat. No. 5,213,230 in which a molded plastic divider 10 having a centrally located upstanding hollow handle 14 is insertable into a cylindrical paint can at any vertical location which corresponds with the surface of a volume of unused paint. Here the purpose is to maintain the freshness and usability of the paint. Similar arrangements are illustrated in Valasek U.S. Pat. No. 4,874,108 and Bainton U.S. Pat. No. 2,167,619.

A still further divider arrangement is illustrated in Holman U.S. Pat. No. 3,040,897. In Holman a strainer or perforated partition 16 is supported within the interior of a cylindrical container by means of side supports 24 at fixed locations on the container interior side wall and corresponding notches 26 in the strainer which permits it to clear the supports for insertion and removal. In an alternative arrangement, the strainer or partition is provided with legs which maintain a set spacing between the surface of the partition and the bottom of the container.

SUMMARY OF THE INVENTION

The present invention provides an internally divided open head container which is preferably but not necessarily of tapered side wall configuration in which the divider lies essentially at right angles to the longitudinal axis of symmetry of the container, sealingly engages the interior side wall of the container at a predetermined and essentially fixed spacing from the floor of the container, is readily insertable and removable and which essentially divides the interior volume of the container into two essentially isolated parts which are vertically arranged along the axis of symmetry of the container.

In general this is achieved through the combination of an open head, essentially cylindrical but preferably tapered container wherein the open head has a larger diameter than the bottom of the one or more support ledges molded or otherwise formed on the interior side wall at a predetermined fixed spacing relative to the bottom of the container, and a removable essentially disk-shaped divider having a hollow upstanding centrally located handle and a peripheral skirt which may be inserted into the container to rest on the side wall ledges for spacing maintenance and for structural strength. The peripheral skirt being tapered and extending downwardly parallel to the interior side wall, thereby telescopically interacting with the interior surface of the container. The support ledges maintain the divider spaced from but parallel to the bottom of the container. The divider being dimensioned so as to essentially sealingly engage the interior side wall of the container when the bottom of the skirt rests on the top surface or surfaces of the support ledge or ledges.

The container and divider of the present invention are presently manufactured of molded non-cellular plastic such as polyethylene and are typically but not necessarily used in combination with a lid or closure which covers the open head or top of the container in the final configuration. Although disclosed and described in detail with reference to an embodiment having only one internal divider, it will be understood and appreciated that two or more parallel internal dividers may be used to subdivide the interior volume of a container into three or more parts.

While the illustrative embodiment of the invention will also be described with reference to a container/divider combination which is particularly useful for the retail marketing of food products, the actual end uses and applications to which the container/divider combination of the subject invention may be placed are numerous and varied and the following disclosure is not to be construed as limiting the use or application of the invention to the retail marketing of food products.

DETAILED DESCRIPTION OF THE PREFERRED EMBODIMENT

Figure 1:
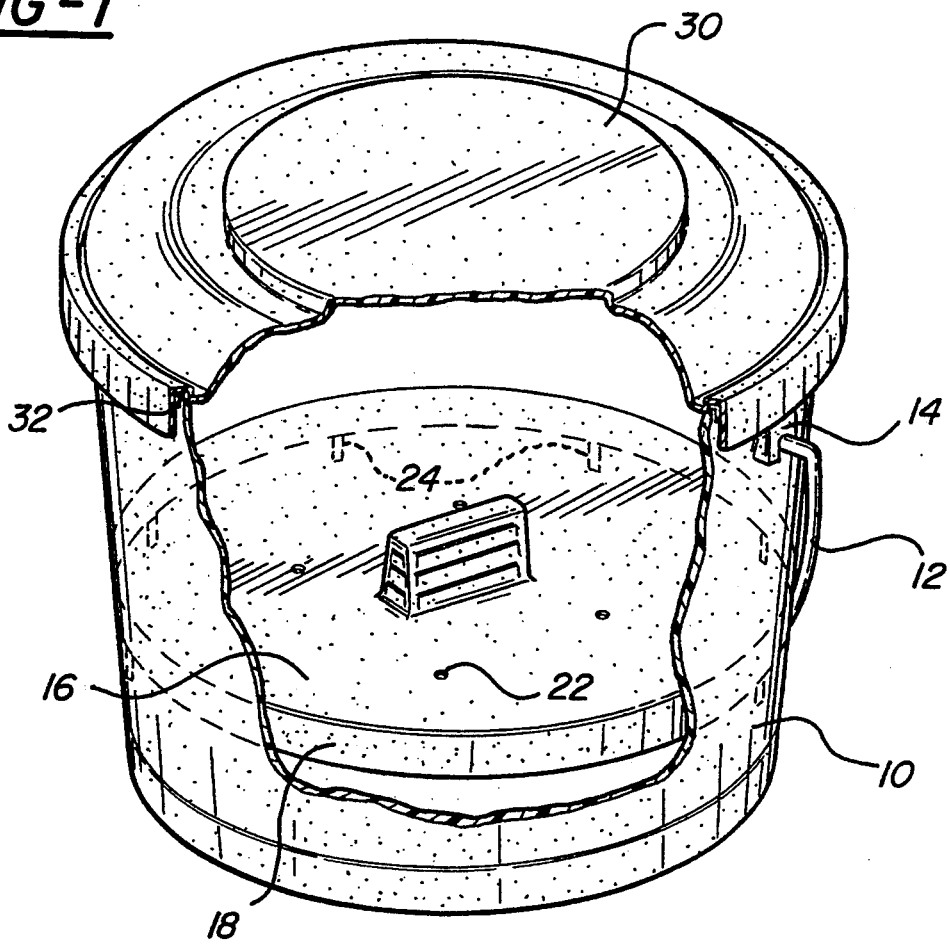
FIG. 1 is a perspective view, partly cut away, of a tapered open head container having an internal divider and a snap-on plastic lid designed and manufactured in accordance with the present invention.
Figure 3:
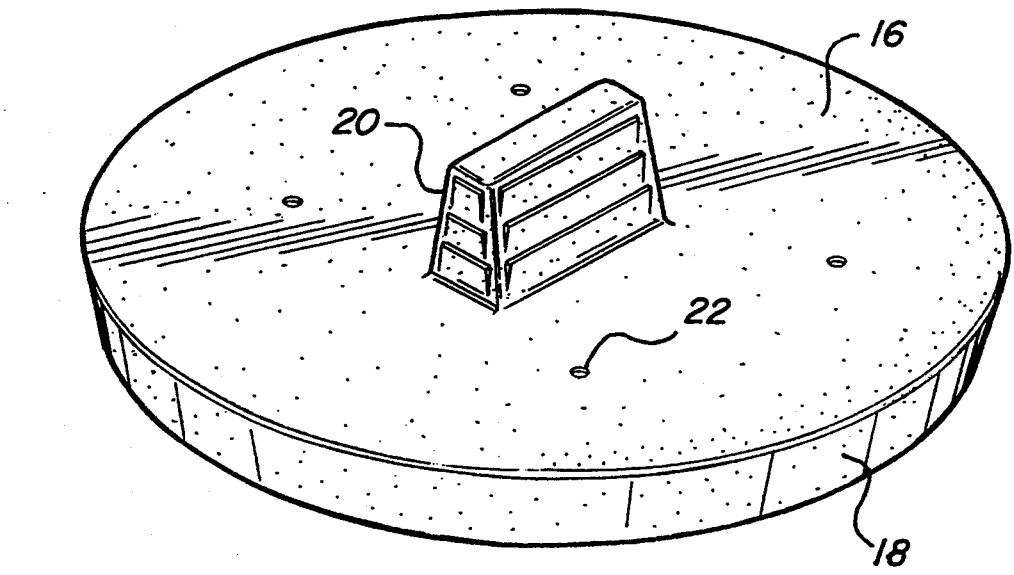
FIG. 3 is a perspective top view of the divider in the combination of FIG. 1.
Figure 2:
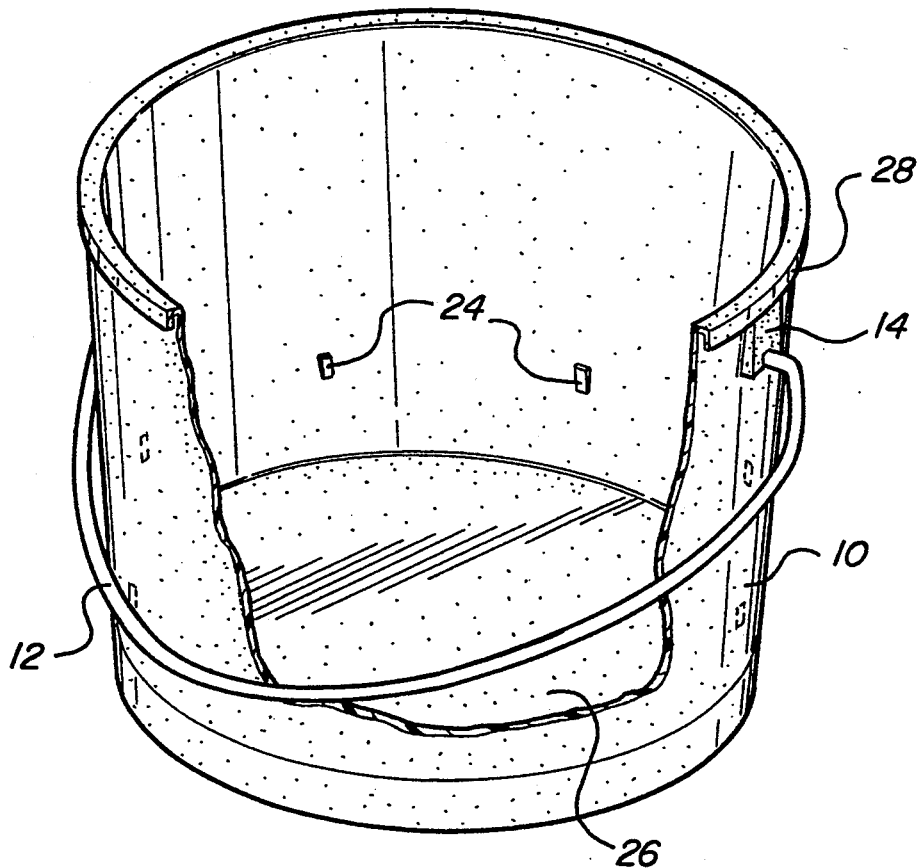
FIG. 2 is a perspective view, partly cut away, of the container of FIG. 1.
Figure 4:
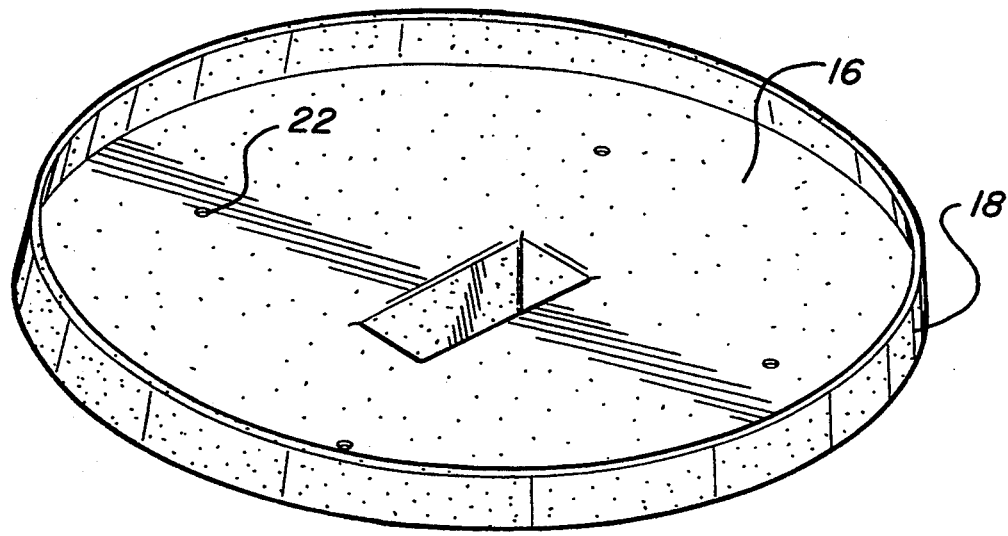
FIG. 4 is a perspective bottom view of the divider of FIGS. 1 and 3.
Figure 5:
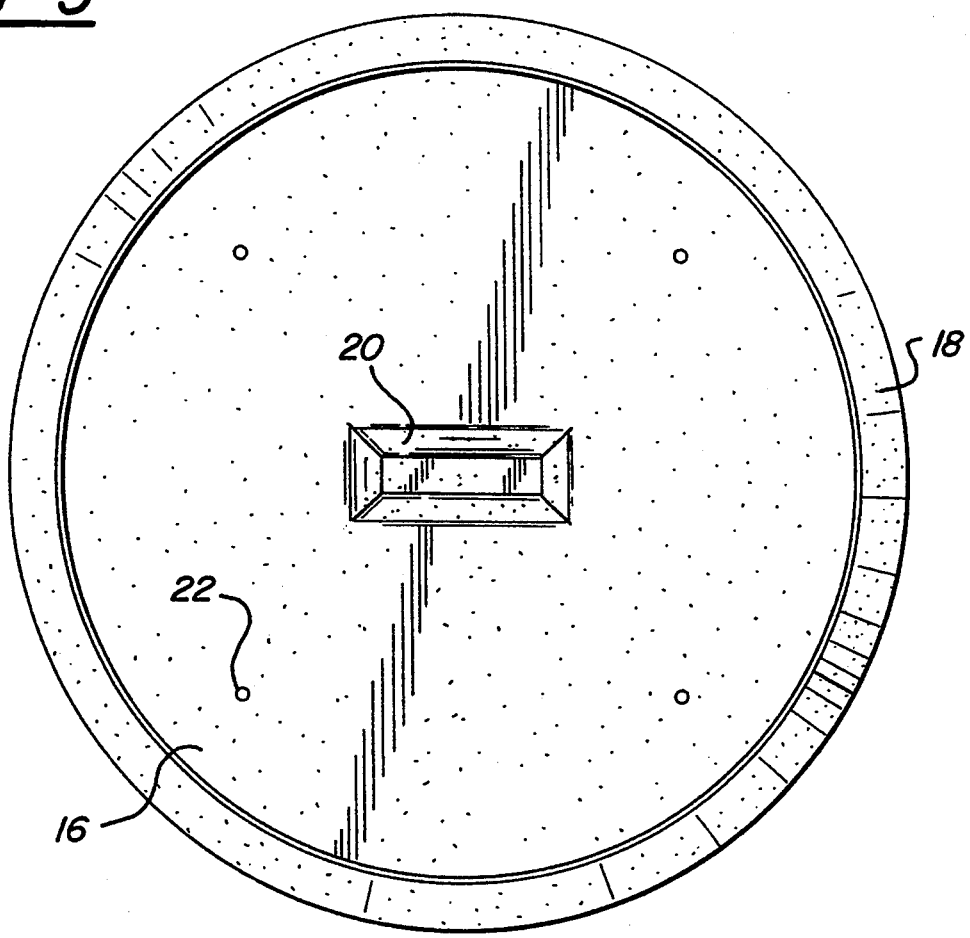
FIG. 5 is a bottom plan view of the divider of FIGS. 1, 3 and 4.

Referring to the drawing, there is shown a generally cylindrical, tapered side wall, open head container 10 having a bail 12 secured to the exterior side wall of the container 10 by means of a pair of diametrically opposed bail brackets 14. Container 10 may, for example, be of approximately 1 gallon in size and interior volume, may be injection molded of non-cellular high density polyethylene and preferably exhibits a tapered side wall. Although the degree of taper may vary, a commercially viable container of $6\frac{1}{4}$ inches in overall height may exhibit an interior diameter of $8\frac{5}{8}$ inches at the top and an interior diameter of 7¼ inches at or near the bottom. Container 10 has an open circular top and a floor 26 which is raised approximately ½ inch from the bottom of the container side wall. These dimensions are, as the reader will appreciate, given only by way of example.

Figure 6:
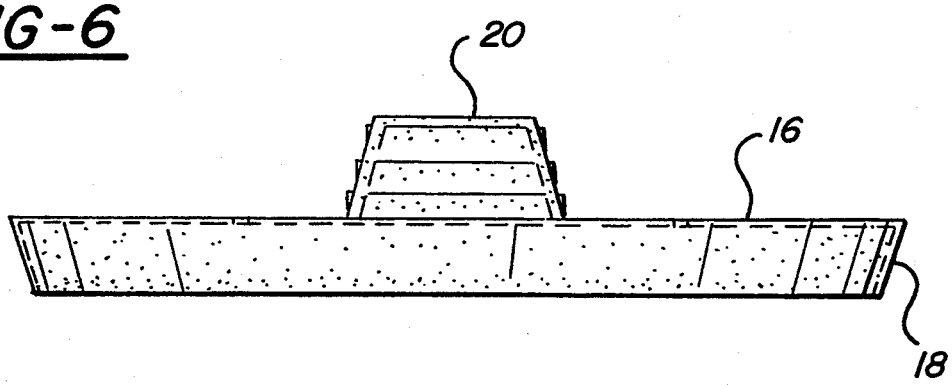
FIG. 6 is a side view of the divider of FIGS. 1, 3, 4 and 5.

The container combination illustrated in the drawing further comprises a molded polyethylene divider 16 of generally circular configuration but having a skirt 18 which, as best shown in FIG. 6, is tapered to match the taper of the container 10. The divider 16 is provided with a hollow centrally located upstanding handle 20 having ribbed outer surfaces to facilitate gripping. In addition, the divider 16 is formed with a number of spaced vent holes 22. In the embodiment whose dimensions are recited above, the overall diameter of the divider 16 is 8 inches and the dimension of the skirt 18 along the longitudinal or vertical axis of the container is approximately 9/16 of an inch. The preferred material is high density polyethylene but a variety of other materials may also be used. The vents 22 may be increased in number, decreased in number, or omitted altogether in accordance with the particular application to which the device is placed.

The interior side wall of container 10 is molded so as to exhibit a plurality of uniformly circumferentially spaced support ledges 24 which protrude inwardly from the interior side wall of the container 10 and are located in spaced relationship to the floor 26 of container 10 so that the bottom surface of the skirt 18 of the divider 16 engages the ledges 24 at a location in which the outer peripheral surface of skirt 18 snugly and sealingly engages the interior side wall of container 10. Obviously, the number and spacing of the support ledges 24 may vary and, in fact, it is possible to provide a single circular ledge. However, practical considerations such as the ease with which the container 10 is ejected from the mold during the manufacturing operation suggest the formation of a discontinuous support arrangement such as is illustrated in the drawing. The spacing of the support ledges 24 relative to the bottom 26 of container 10 will vary in accordance with the objectives of the designer in dividing up the interior volume of container 10; e.g., the two interior volumes may be equal or significantly non-equal according to the type and quantity of goods to be placed within the container 10.

Finally, the container combination illustrated in FIG. 1 is provided with a removable domed molded polyethylene lid 30 having a peripheral channel 32 which engages a turned over rim or hem 28 which is formed at the upper periphery of the open head container 10. The lid 30 preferably snaps onto the rim 28 of the container 10 to provide a seal, the efficacy and efficiency of which may be designed in accordance with the particular application which is addressed. If, for example, the container 10 is to be used for the temporary transportation and storage of hot comestibles, the seal which is provided between the lid 30 and the rim 28 of the container 10 may be a relatively simple one providing good thermal efficiency without the use of special gaskets or sealing materials. The engagement between the lid 30 and the rim 28 of the container is such that the lid 30 may be simply applied and removed by hand and without the use of tools.

In a typical operation/application of the container combination illustrated in the drawing, a first food product such as spaghetti sauce may be placed in the lower portion of container 10 bounded vertically by the floor 26 and the plane of the support ledges 24. The divider 16 may thereafter be lowered into place and all of some portion of the upper part of container 10 filled with a second food product such as pasta noodles or spaghetti. The lid 30 is snapped into place, the bail 12 raised over the lid for carrying and the entire unit may thereafter be exchanged between persons in an over-the-counter retail sale transaction. Of course, may other applications will be apparent to those who read the patent document.

The top surface of the lid 30 may provide a convenient location for advertising or logos. Similarly, the large cylindrical side surface of the container 10 provides an equally attractive opportunity for labeling, silk screen printing or coloring in various ways to enhance the commercial and/or personal appeal of the product.

We claim:

1. A dividable container combination comprising:
   an open head container having a planar bottom, an open top and at least one tapered interior side wall surface;
   said open head having a larger diameter than said planar bottom;
   support means formed on the interior surface in a plane which is spaced from but parallel to the bottom of the container; and
   a divider which is insertable into and removable from the container; said divider having an essentially planar surface bounded by a tapered downwardly extending peripheral skirt which is dimensioned and adapted to engage the interior surface of the container in an essentially sealing engagement while disposed on and supported by said support means, said tapered peripheral skirt extending parallel to said interior sidewall, thereby to divide the interior volume of the container into several parts, said peripheral skirt telescopically interacting with the interior surface of the container.

2. Apparatus as defined in claim 1 further including a lid adapted to be removably disposed on the open head of the container.

3. Apparatus as defined in claim 1 wherein the container is of essentially tapered cylindrical configuration, and the skirt of the divider is tapered to conform with the tapered interior side wall of the container.

4. Apparatus as defined in claim 3 wherein the divider is vented.

5. Apparatus as defined in claim 4 wherein the divider further includes a hollow centrally located upstanding handle.

6. Apparatus as defined in claim 1 further including a bail mounted on the exterior surface of the container for carrying the container and divider.

7. Apparatus as defined in claim 1 wherein the support means comprises a plurality of support ledges located coplanarly and in spaced relationship to the bottom of the container.

8. A container apparatus comprising in combination:
   an essentially cylindrical open head container having a floor and an open head bounded by a peripheral rim, said container having a tapered side wall having interior and exterior surfaces;
   said open head having a larger diameter than said floor;
   a plurality of support ledges molded on the interior surface of the container in a single plane which is spaced from but parallel to the floor of the container;

a molded plastic divider having a circular planar body and a tapered downwardly extending peripheral skirt integral with said body, said tapered peripheral skirt extending parallel to said interior sidewall, said divider being dimensioned and adapted to be removably placed into the container with the outer periphery of the skirt in sealing engagement with the inner side wall surface of the container as the skirt engages and is supported by the support ledges, said peripheral skirt telescopically interacting with the interior surface of the container; and a lid for engagement with the rim of the container.

9. Apparatus as defined in claim 8 wherein the container is further provided with a bail mounted to the exterior side wall surface thereof.

* * * * *